(12) United States Patent
Asheim et al.

(10) Patent No.: US 11,002,246 B2
(45) Date of Patent: May 11, 2021

(54) ROTOR BLADE WITH A SERRATED TRAILING EDGE

(71) Applicant: SIEMENS GAMESA RENEWABLE ENERGY A/S, Brande (DK)

(72) Inventors: Michael J. Asheim, Vejle (DK); Oriol Ferret Gasch, Vejle (DK); Stefan Oerlemans, Herning (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 44 days.

(21) Appl. No.: 16/093,843

(22) PCT Filed: Nov. 22, 2016

(86) PCT No.: PCT/US2016/063288
§ 371 (c)(1),
(2) Date: Oct. 15, 2018

(87) PCT Pub. No.: WO2017/180192
PCT Pub. Date: Oct. 19, 2017

(65) Prior Publication Data
US 2019/0113019 A1      Apr. 18, 2019

(30) Foreign Application Priority Data

Apr. 15, 2016  (WO) ................ PCT/EP2016/058428

(51) Int. Cl.
*F03D 1/06*       (2006.01)
*F03D 7/02*       (2006.01)

(52) U.S. Cl.
CPC ......... *F03D 1/0675* (2013.01); *F03D 1/0633* (2013.01); *F03D 1/0641* (2013.01);
(Continued)

(58) Field of Classification Search
CPC .... F03D 1/0675; F03D 1/0633; F03D 1/0641; F03D 7/0296
See application file for complete search history.

(56) References Cited

U.S. PATENT DOCUMENTS 5,533,865 A * 7/1996 Dassen ................ F03D 1/0608
                                                                   416/228
7,909,576 B1 * 3/2011 van der Bos ......... F03D 1/0675
                                                                  416/146 R
(Continued)

FOREIGN PATENT DOCUMENTS

CN     104454379 A      3/2015
DE  102010026588 A1    1/2012
(Continued)

OTHER PUBLICATIONS

International Search Report & Written Opinion for PCT/US2016/063288.
(Continued)

*Primary Examiner* — David E Sosnowski
*Assistant Examiner* — Wesley Le Fisher
(74) *Attorney, Agent, or Firm* — Schmeiser, Olsen & Watts LLP

(57) ABSTRACT

A rotor blade for a wind turbine, wherein the rotor blade includes serrations along at least a portion of the trailing edge section of the rotor blade is provided. The serrations include a first tooth and at least a second tooth, wherein the first tooth is spaced apart from the second tooth. Furthermore, the area between the first tooth and the second tooth is at least partially filled with a plurality of comb elements, wherein the comb elements are arranged substantially parallel to each other and in substantially chordwise direction of the rotor blade such that generation of noise in the trailing edge section of the rotor blade is reduced. The rotor blade is further characterized in that it includes a plurality of ridges
(Continued)

including a first ridge and at least a second ridge for manipulating an airflow which is flowing along the ridges.

20 Claims, 7 Drawing Sheets

(52) U.S. Cl.
CPC ........ *F03D 7/0296* (2013.01); *F05B 2240/21* (2013.01); *F05B 2250/181* (2013.01); *F05B 2250/183* (2013.01); *F05B 2260/96* (2013.01); *Y02E 10/72* (2013.01)

(56) References Cited

U.S. PATENT DOCUMENTS

| | | | | |
|---|---|---|---|---|
| 9,476,406 B2* | 10/2016 | Obrecht | ................ | F03D 1/0675 |
| 9,752,559 B2* | 9/2017 | Herr | .......................... | B64C 3/58 |
| 2003/0175121 A1 | 9/2003 | Shibata | ................. | F03D 1/0641 |
| | | | | 416/131 |
| 2008/0134837 A1* | 6/2008 | Wai | ........................... | C22B 3/02 |
| | | | | 75/396 |
| 2008/0187442 A1* | 8/2008 | Standish | ................. | F03D 1/065 |
| | | | | 416/235 |
| 2009/0016891 A1* | 1/2009 | Parsania | ............... | F03D 1/0675 |
| | | | | 416/223 R |
| 2011/0142635 A1* | 6/2011 | Fritz | ..................... | F03D 1/0675 |
| | | | | 416/62 |
| 2011/0142637 A1* | 6/2011 | Riddell | ................. | F03D 1/0633 |
| | | | | 416/62 |
| 2011/0142665 A1* | 6/2011 | Huck | .................... | F03D 1/0633 |
| | | | | 416/228 |
| 2011/0223030 A1* | 9/2011 | Huck | .................... | F03D 1/0675 |
| | | | | 416/228 |
| 2012/0134837 A1* | 5/2012 | Drobietz | ............... | F03D 1/0675 |
| | | | | 416/228 |
| 2013/0164141 A1* | 6/2013 | Lin | ....................... | F03D 1/0641 |
| | | | | 416/223 R |
| 2013/0170999 A1* | 7/2013 | Vassilicos | ............... | F03D 80/00 |
| | | | | 416/223 R |
| 2014/0072441 A1* | 3/2014 | Asheim | ................. | F03D 1/0608 |
| | | | | 416/241 R |
| 2014/0227101 A1 | 8/2014 | Yao | | |
| 2014/0377077 A1* | 12/2014 | Gruber | .................... | F01D 5/141 |
| | | | | 416/228 |
| 2015/0017008 A1* | 1/2015 | Ramachandran | ..... | F03D 1/0633 |
| | | | | 416/223 B |
| 2015/0078896 A1* | 3/2015 | Oerlemans | ............ | F03D 1/0608 |
| | | | | 416/1 |
| 2015/0078910 A1* | 3/2015 | Oerlemans | ............ | F03D 1/0608 |
| | | | | 416/228 |
| 2015/0078913 A1* | 3/2015 | Enevoldsen | .......... | F03D 1/0608 |
| | | | | 416/241 R |
| 2015/0176564 A1* | 6/2015 | Kumar | .................. | F03D 1/0675 |
| | | | | 416/23 R |
| 2016/0312763 A1* | 10/2016 | Arce | ..................... | F03D 1/0633 |
| 2016/0327020 A1* | 11/2016 | Tobin | .................... | F03D 1/0633 |
| 2017/0009735 A1* | 1/2017 | Diez-Garias | ............ | F01D 5/14 |
| 2017/0122286 A1* | 5/2017 | Alexander | ............ | F03D 1/0633 |
| 2018/0347540 A1* | 12/2018 | Hurault | ................. | F03D 1/0675 |
| 2020/0277931 A1* | 9/2020 | Arce | ..................... | F03D 1/0675 |

FOREIGN PATENT DOCUMENTS

| | | | | | |
|---|---|---|---|---|---|
| WO | WO-2014044412 A1 * | 3/2014 | | .......... | F03D 1/0633 |
| WO | 2015121044 A1 | 8/2015 | | | |
| WO | WO2015121044 A1 | 8/2015 | | | |
| WO | WO 2015121044 A1 | 8/2015 | | | |
| WO | 2015167604 A1 | 11/2015 | | | |
| WO | 2015169471 A1 | 11/2015 | | | |
| WO | WO2015167604 A1 | 11/2015 | | | |
| WO | WO 2015167604 A1 | 11/2015 | | | |
| WO | WO2015169471 A1 | 11/2015 | | | |
| WO | WO 2015169471 A1 | 11/2015 | | | |
| WO | 2015192915 A1 | 12/2015 | | | |
| WO | WO2015192915 A1 | 12/2015 | | | |
| WO | WO 2015192915 A1 | 12/2015 | | | |
| WO | 2016184619 A1 | 11/2016 | | | |
| WO | WO 2016184619 A1 | 11/2016 | | | |

OTHER PUBLICATIONS

Non-English Chinese Office Action dated Mar. 27, 2020 for Application No. 201680086796.4.

* cited by examiner

ROTOR BLADE WITH A SERRATED TRAILING EDGE

CROSS-REFERENCE TO RELATED APPLICATIONS

This application claims priority to PCT Application No. PCT/US2016/063288, having a filing date of Nov. 22, 2016, based off of PCT/EP2016/058428, having a filing date of Apr. 15, 2016, the entire contents both of which are hereby incorporated by reference.

FIELD OF TECHNOLOGY

The following relates to a rotor blade for a wind turbine, wherein the rotor blade is designed such that generation of noise in the trailing edge section of the rotor blade is reduced compared to conventional rotor blades. The following furthermore relates to a wind turbine comprising at least one such rotor blade.

BACKGROUND

During rotation of a rotor blade about the rotational axis of the rotor of a wind turbine, noise is commonly generated at the trailing edge section of the rotor blade. Generally, a high level of noise is emitted if the angle between the mean flow direction of the airflow and the trailing edge is about ninety degrees. Additionally, mixing of the airflow from suction and pressure side of the rotor blade past the trailing edge, which is also referred to as flow recovery, can lead to turbulence which can also adversely impact the noise which is generated by the rotor blade.

This noise may be an issue, for instance, if the wind turbine is installed onshore near a residential area. In this case, threshold values indicating the maximum allowable noise being generated by the wind turbine generally apply.

It is known since many years that the provision of serrations at the trailing edge section of a wind turbine rotor blade is capable to realize a reduction of noise being generated by the rotor blade. Due to the serrations, the angle between the mean flow direction of the airflow and the trailing edge is modified. This modification may significantly reduce the generated noise at the trailing edge.

Recently, it has been discovered that a further noise reduction at the trailing edge section can be achieved by the provision of a plurality of comb elements between adjacent teeth of the serrated trailing edge. These comb elements may also referred to as fibers.

Obviously, a certain level of noise is still emitted at the trailing edge section of the rotor blade, despite the provision of the combed teeth at the trailing edge section of the rotor blade. The following seeks to present a concept how to further reduce the noise which is generated at the trailing edge section of the rotor blade of a wind turbine.

SUMMARY

According to an aspect of embodiments of the invention, there is provided a rotor blade for a wind turbine, wherein the rotor blade comprises serrations along at least a portion of the trailing edge section of the rotor blade. The serrations comprise a first tooth and at least a second tooth, wherein the first tooth is spaced apart from the second tooth. The area between the first tooth and the second tooth is at least partially filled with a plurality of comb elements, wherein the comb elements are arranged substantially parallel to each other and in substantially chordwise direction of the rotor blade such that generation of noise in the trailing edge section of the rotor blade is reduced. The rotor blade is further characterized in that it comprises a plurality of ridges comprising a first ridge and at least a second ridge for manipulating an airflow which is flowing along the ridges.

The use of ridges at the trailing edge section of a rotor blade of a wind turbine for reducing the noise which is generated at the trailing edge is known, for instance, by the patent applications DE 10 2010 026 588 A1 or WO 2015/167604 A1. However, these structures have been proposed as an alternative and improvement with regard to the known serrated trailing edges. Consequently, these concepts have been exclusively applied to straight trailing edges.

The present inventors have discovered that the combination of a combed teeth structure and ridges at the trailing edge section of the rotor blade of a wind turbine is capable to reduce the noise being generated at the trailing edge section to a surprisingly high and unexpected extent.

The combed teeth structure at the trailing edge section of the rotor blade can generally be described as the provision of a plurality of comb elements which are arranged between the teeth of the serrations, wherein the serrations are located along at least a portion of the trailing edge section of the rotor blade. At least two comb elements are arranged between a first and a second tooth of the serrations. Preferably, several comb elements, such as between five and twenty comb elements, are arranged between the first and second tooth. The first and second tooth are spaced apart from each other, and they preferably represent teeth which are directly adjacent to each other.

Note that the expression "comb element" is interchangeable with the expression "fiber". Thus, the plurality of comb elements may also be referred to as a plurality of fibers. Furthermore, it may be stated that the plurality of comb elements build a comb.

The function of the comb elements is to act as an auxiliary, i.e. secondary, noise reduction means at the trailing edge of the rotor blade compared to the main noise reduction means realized by the teeth of the serrations.

The comb elements do not necessarily need to reach until the tips of the teeth of the serrations. Some or all comb elements may also just fill a portion of the area between the first and second tooth. In an advantageous embodiment of the invention, however, the comb elements fill the complete area between the first tooth and the second tooth.

Furthermore, it is noted that the comb elements may also extend further downstream than the serrations do. Some or all comb elements may thus cover an area at the trailing edge section of the rotor blade which is further downstream than where the tips of the teeth of the serrations are located.

The comb elements are arranged substantially parallel to each other and they are arranged in substantially chordwise direction of the rotor blade.

In the context of this patent application, the notion "substantially" includes deviations of up to ten percent or, in relation to the orientation of an object, deviations of up to twenty degrees.

The chordwise direction at a rotor blade is defined by the chord line at the respective spanwise position of the rotor blade. The chord line is defined as the straight line connecting the leading edge and the trailing edge of the rotor blade and being perpendicular to the span of the rotor blade. In this regard, the span is defined as the line between the root and the tip of the rotor blade.

Note that frequently the chordwise direction substantially coincides with the mean flow direction of the airflow.

Therefore, the arrangement of the comb elements between the teeth of the serrations may also be described as being substantially parallel to the mean flow direction of the airflow.

In an advantageous embodiment of the invention, the ridges are arranged substantially parallel to each other. Furthermore, they are preferably arranged in substantially chordwise direction of the rotor blade.

In other words, preferably not only the comb elements, but also the ridges are parallel to each other and aligned with the mean flow direction of the airflow. Such an orientation of the ridges is beneficial in terms of the desired noise reduction capability of the arrangement.

In another advantageous embodiment of the invention, the first ridge comprises a length which is at least three times greater, in particular at least five times greater, than its height. Additionally or alternatively, the first ridge comprises a length which is at least three times greater, in particular at least five times greater, than its width.

In other words, the ridge is preferably designed as an elongated object with a length which is significantly greater than its width and/or its height.

Typically, the height of the ridge varies along its length. Therefore, the mentioned preferred length-to-height ratio relates to the maximum height of the ridge. Thus, even at the position of its maximum height, the ridge is beneficially significantly smaller in height than greater in length.

This applies likewise to the width of the ridge. Again, typically, the width of the ridge varies along its length. Therefore, the recommended length-to-width ratio relates to the maximum width of the ridge. So, even at the position of its maximum width, the ridge is beneficially significantly narrower compared to its height.

In another advantageous embodiment, the ridges are aligned with the comb elements.

This is to be understood that the configuration of the ridges are adapted, i.e. adjusted, to the configuration of the comb elements. In this context, the configuration of an object includes its design, location and orientation. As an example, the length axes of the ridges and the length axes of the ridges may be aligned such that they are substantially parallel to each other. As another example, the dimensions in particular the height of the ridges and the comb elements may be similar to each other.

A further example of an advantageous alignment between the ridges and the comb elements is that each comb element of the plurality of comb elements is associated with one ridge of the plurality of ridges. Alternatively, every second comb element of the plurality of comb elements may be associated with one ridge of the plurality of ridges.

Next, a trailing edge and a leading edge can be attributed to each ridge. The trailing edge is defined as that portion of the ridge which is facing the trailing edge of the rotor blade. Similarly, the leading edge of a ridge is defined as that portion of the ridge which is facing away from the trailing edge of the rotor blade.

In an advantageous embodiment of the invention, the first ridge comprises a trailing edge which extends onto the first tooth of the serrations, i.e. onto the surface of the first tooth.

In other words, the ridge, which is typically mounted upstream of the serrations on the surface of the rotor blade, does not stop before or at the beginning of the respective tooth, but extends onto it. This has the advantage that the airflow, which is guided and manipulated in a favorable manner by the ridges, is influenced in a beneficial way until reaching the teeth and in addition to it even after reaching the teeth.

In certain embodiments it may be advantageous to extend the ridges until the flanks, i.e. until the sides, or even until the tip of the respective tooth. It may also be beneficial to merge the ridges with the comb elements projecting into the area between the teeth or beyond the teeth.

Regarding the shape and design of the ridges, several options are suggested which could provide beneficial results in term of noise reduction.

In a first design option, the trailing edge of the ridge is smoothly fading out towards the trailing edge of the rotor blade. The maximum height of the ridge may be in the center part of the ridge (lengthwise) or at the leading edge of the ridge.

In a second design option, the trailing edge of the ridge has the shape of a quarter circle in a sectional view. Preferably, the maximum height of the ridge is at the trailing edge of the ridge. This design option may also be described as a ridge having its maximum height substantially at the trailing edge of the ridge, wherein the trailing edge is rounded, i.e. blunt.

Although rotor blades with a serrated trailing edge may in principle be manufactured as one single piece, the inventive rotor blade is preferably made of at least two parts, a rotor blade body and a (serrated) plate, which are manufactured separately and joined together subsequently. The comb elements are provided between the teeth of the serrated plate and the ridges are also provided at the plate. The ridges may be mounted to the plate after provision of the plate or the plate may be made with integrated ridges.

In a preferred embodiment, the serrated plate is attached to the pressure side of the rotor blade body by means of an attachment section. The attachment at the pressure side is beneficial for aerodynamic reasons in most cases.

If ridges are provided at the pressure side of the plate, the ridges may cover the entire length from the upstream end of the attachment section until the teeth of the serrations.

If ridges are provided at the suction side of the plate, the ridges may generally cover the suction side of the plate from its upstream most area, which generally corresponds to the downstream end of the attachment section, until the teeth of the serrations.

Alternatively, the ridges, if they are mounted at the suction side of the rotor blade body and the plate is attached to the rotor blade body at the pressure side thereof, may also extend further upstream than the plate. In other words, the ridges may partially extend on the surface of the rotor blade body. This has the effect that the longitudinal extension of the ridges is extended.

In the following, some exemplary dimension of the comb elements and ridges at the trailing edge section of the rotor blade are given. Note that these dimension are given by way of example only and not limiting the scope of embodiments of the invention. Furthermore note that the concrete dimensions need to be optimized with regard to the dimension of the rotor blade, e.g. its total spanwise length and its maximum chord length of the rotor blade.

The maximum height of the ridges may be less than twenty millimeters, e.g. it may be in the range of one to twenty millimeters. In particular, the maximum height may be less than ten millimeter. Even more particularly, the maximum height may be less than five millimeters.

The maximum width of the ridges may be less than ten millimeters. In particular, the maximum width may be less than five millimeter. Even more particularly, the maximum width may be equal or less than two millimeters.

The length of the ridges may vary in a range between ten millimeters and five hundred millimeters. The length of the ridges greatly depends on the size of the serrated plate and whether the ridges only reach until the teeth of the serration or extend onto the surface of the teeth. It is also noted that, generally, ridges on the pressure side, so-called pressure side ridges, are larger than ridges on the suction side, which are also referred to as suction side ridges.

The spacing between two adjacent ridges is preferably larger than the maximum width of the respective ridges and smaller than ten times the mentioned maximum width of the respective ridges. The exact spacing depends, for instance, on the ridge-to-comb element alignment ratio (e.g. 1:1 or 1:2).

Finally note that embodiments of the present invention are most advantageously suited for rotor blades of a wind turbine. However, the present patent application also seeks patent protection for the entire wind turbine for generating electricity with at least one rotor blade as described above.

BRIEF DESCRIPTION

Some of the embodiments will be described in detail, with references to the following Figures, wherein like designations denote like members, wherein.

DETAILED DESCRIPTION

Figure 1:
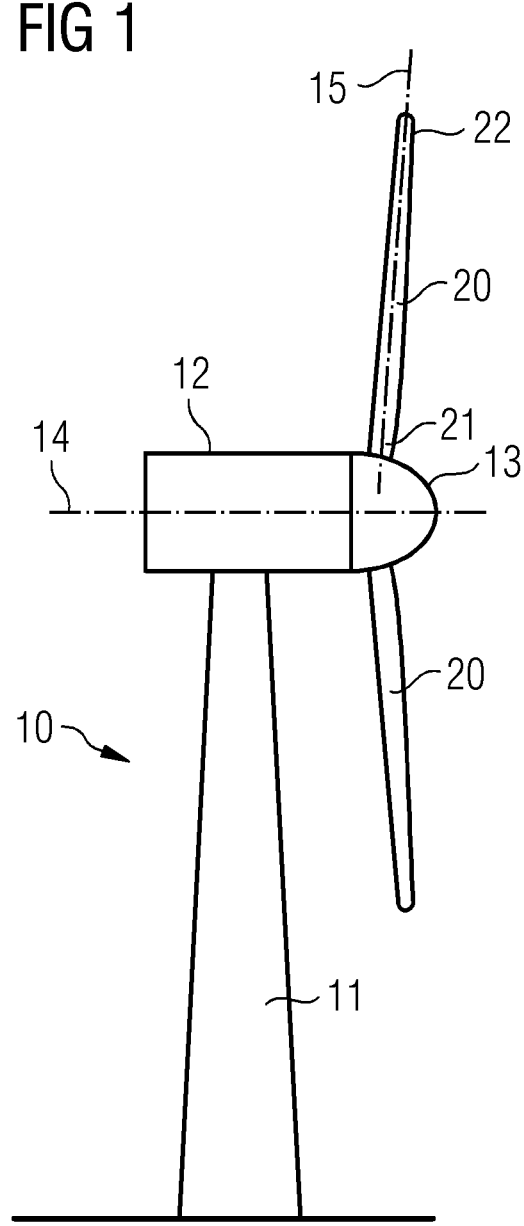
FIG. 1 shows a wind turbine.

The illustration in the drawings is in schematic form. It is noted that in different figures, similar or identical elements may be provided with the same reference signs.

FIG. 1 is a highly schematic drawing of a wind turbine 10. The wind turbine 10 comprises a tower 11 and a nacelle 12. The nacelle 12 is rotatable mounted at the top of the tower 11. This enables a so-called yaw movement of the nacelle 12 with regard to the tower 11. The nacelle 12 accommodates the generator of the wind turbine 10 and several other components of the wind turbine 10.

The wind turbine 10 further comprises a hub 13 which is mounted rotatable with regard to the nacelle 12. The hub 13 is able to perform a rotational movement about a rotational axis 14. This rotational movement is transformed into electricity by the generator of the wind turbine 10.

The energy of the wind is captured by the rotor blades 20. Wind turbines typically comprise at least two rotor blades, preferably three. Each rotor blade 20 is mounted in a pivotable manner to the hub 13 at its respective root section 21. The pivotable attachment of the rotor blade 20 allows for a pitch movement of the rotor blade 20, which in turn allows for an optimum efficiency of the wind turbine 10 over a broad range of wind speeds, typically between three and thirty meter/seconds. The pitch movement is carried out about a pitch axis 15 which basically extends from the root section 21 until the tip section 22 of the rotor blade 20.

Figure 2:
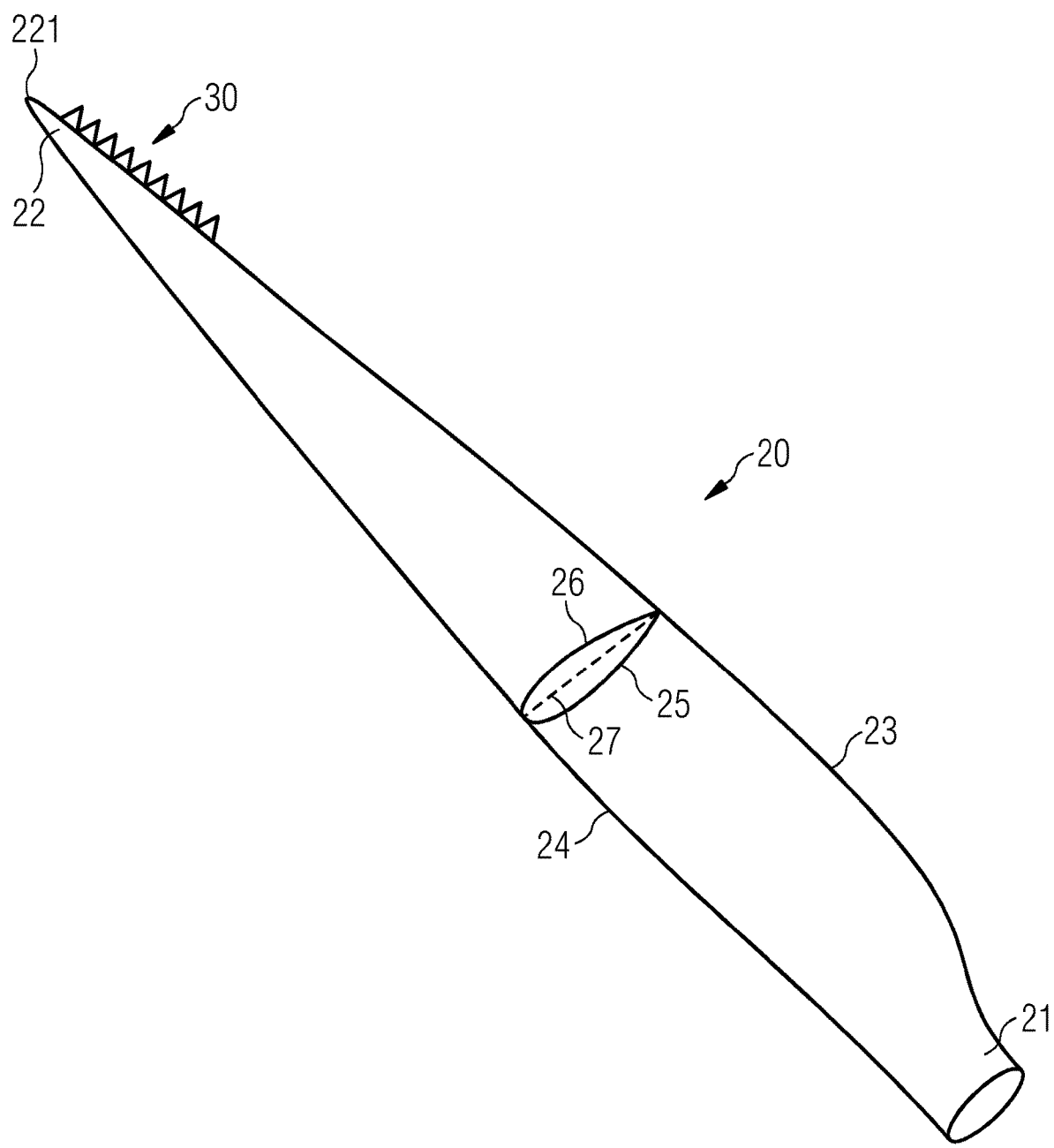
FIG. 2 shows a known art rotor blade of a wind turbine with a serrated trailing edge.

FIG. 2 is a perspective view of a known art rotor blade 20 of a wind turbine. The rotor blade 20 comprises a serrated trailing edge in its tip section 22 and further inboard thereof. The point of the rotor blade 20 which is furthest away from the root section 21 is referred to as the tip 221 of the rotor blade 20. The main portion of the rotor blade 20 is represented by the airfoil portion. The airfoil portion is generally characterized by an airfoil shape of the respective cross-sections. The airfoil shape is able to generate lift when impacted by a flow of a fluid, such as air.

In FIG. 2, one airfoil is exemplarily drawn in. The airfoil comprises a suction side 26 and a pressure side 25. Both sides 25, 26 are separated from each other by the chord line 27. The chord line 27 is a straight line connecting the leading edge section 24 and the trailing edge section 23 of the rotor blade 20. The trailing edge section 23 frequently has the shape of a relatively sharp edge, in particular towards the tip section 22 of the rotor blade 20.

FIG. 2 illustrates serrations 30 which are provided at the trailing edge section 23 in the outboard part, i.e. the radially outer half of the rotor blade 20. The serrations 30 comprise a plurality of triangular-shaped teeth. The serrations 30, which may be realized by a serrated plate (which is commonly also referred to as a serrated panel), may e.g. be attached to the pressure side 25 of the rotor blade. Alternatively, the plate may also be slid into a gap (or slit) which is provided at the trailing edge after manufacturing of the two half-shells of the rotor blade.

Figure 3:
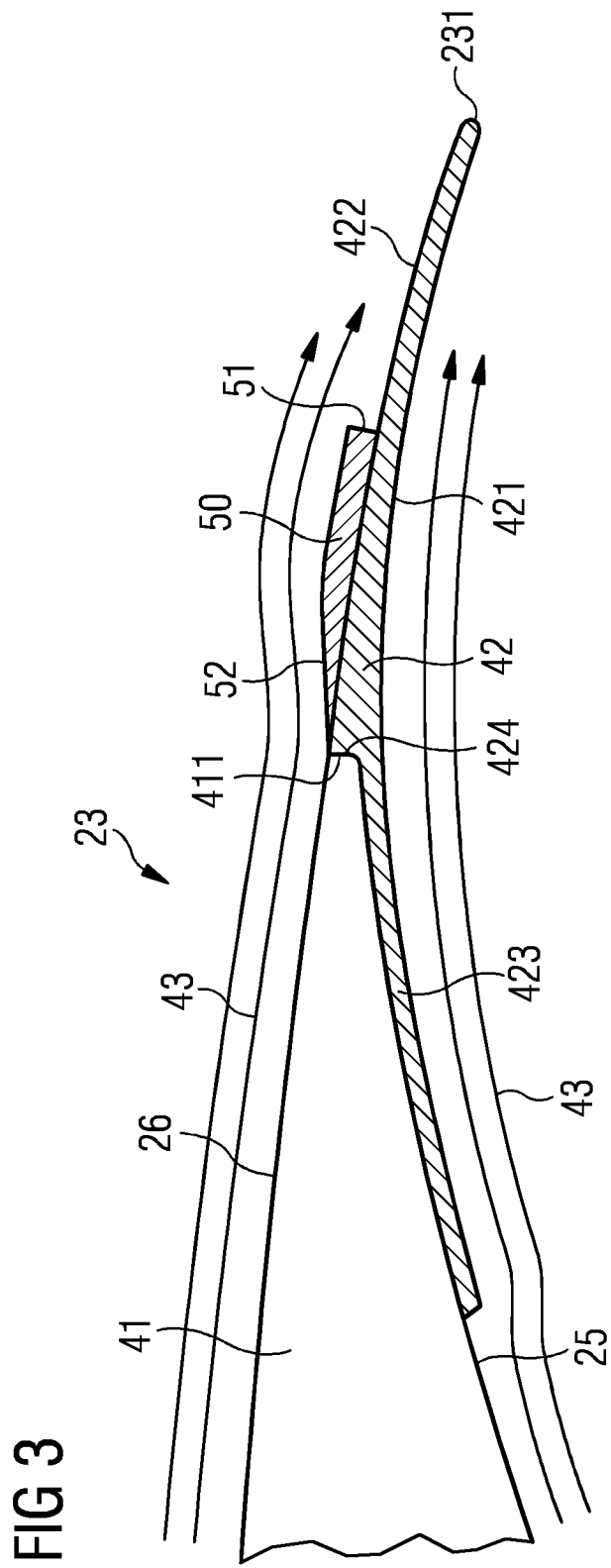
FIG. 3 shows a trailing edge section of a rotor blade according to a first embodiment of the invention.

FIG. 3 shows a schematic sectional view of a trailing edge section 23 of a rotor blade according to a first embodiment of the invention. The rotor blade comprises a rotor blade body 41 and a plate 42 with serrations. The presence of the serrations is not visible in FIG. 3 due to the sectional view character of the drawing.

The plate 42 comprises a pressure side 421, a suction side 422, an attachment section 423 and an alignment section 424. The attachment section 423 is destined for attaching the plate 42 to remaining parts of the rotor blade, such as a rotor blade body 41. The alignment section 424 is destined for aligning the plate 42 to the remaining rotor blade during attachment of the plate 42. In the example shown in FIG. 3, the plate 42 is attached to the rotor blade body 41 at the pressure side 25 of the rotor blade body 41. The attachment of the plate 42 at the pressure side 25 of the rotor blade body 41 is advantageous in terms of a minimum aerodynamic impact, compared to an attachment of the plate 42 at the suction side 26 of the rotor blade body 41.

The alignment section 424 is designed as a step-like flange. A first reason for the provision of such a flange is the improved alignment of the plate 42 with the rotor blade body 41 during attachment of the plate 42 at the trailing edge section 23 of the rotor blade 20. A second reason for the presence of such a flange is ease of manufacturing, as it is relatively complex to manufacture a truly sharp trailing edge compared to the manufacturing of a trailing edge comprising a certain thickness.

The plate 42 as illustrated in FIG. 3 is equipped with a ridge 50 at its suction side 422. Therefore, the ridge 50 is also referred to as a suction side ridge. The ridge 50 comprises a leading edge 52 and a trailing edge 51. The trailing edge 51 represents the portion of the ridge 50 which is facing towards the trailing edge 231 of the rotor blade.

Note that generally that part of the rotor blade which is located furthest downstream is referred to as the trailing edge of the rotor blade. Without the plate 42, the region 411 would represent the trailing edge of the rotor blade; with the plate 42 mounted to the rotor blade body 41, the region 231 represents the trailing edge of the rotor blade.

The leading edge 52 of the ridge 50 is defined as that part of the ridge 50 which is facing away from the trailing edge 231 of the rotor blade. Alternatively, the leading edge 52 of the ridge 50 may also be defined as that part of the ridge 50 which is facing towards the leading edge of the rotor blade.

In the exemplary first embodiment of the invention, the ridge 50 has a gradually increasing height at its leading edge 52 and an abrupt edge at its trailing edge 51. The design of the edges 51, 52 has a significant impact how the airflow 43 which is flowing along the ridges 50 is manipulated.

Figure 4:
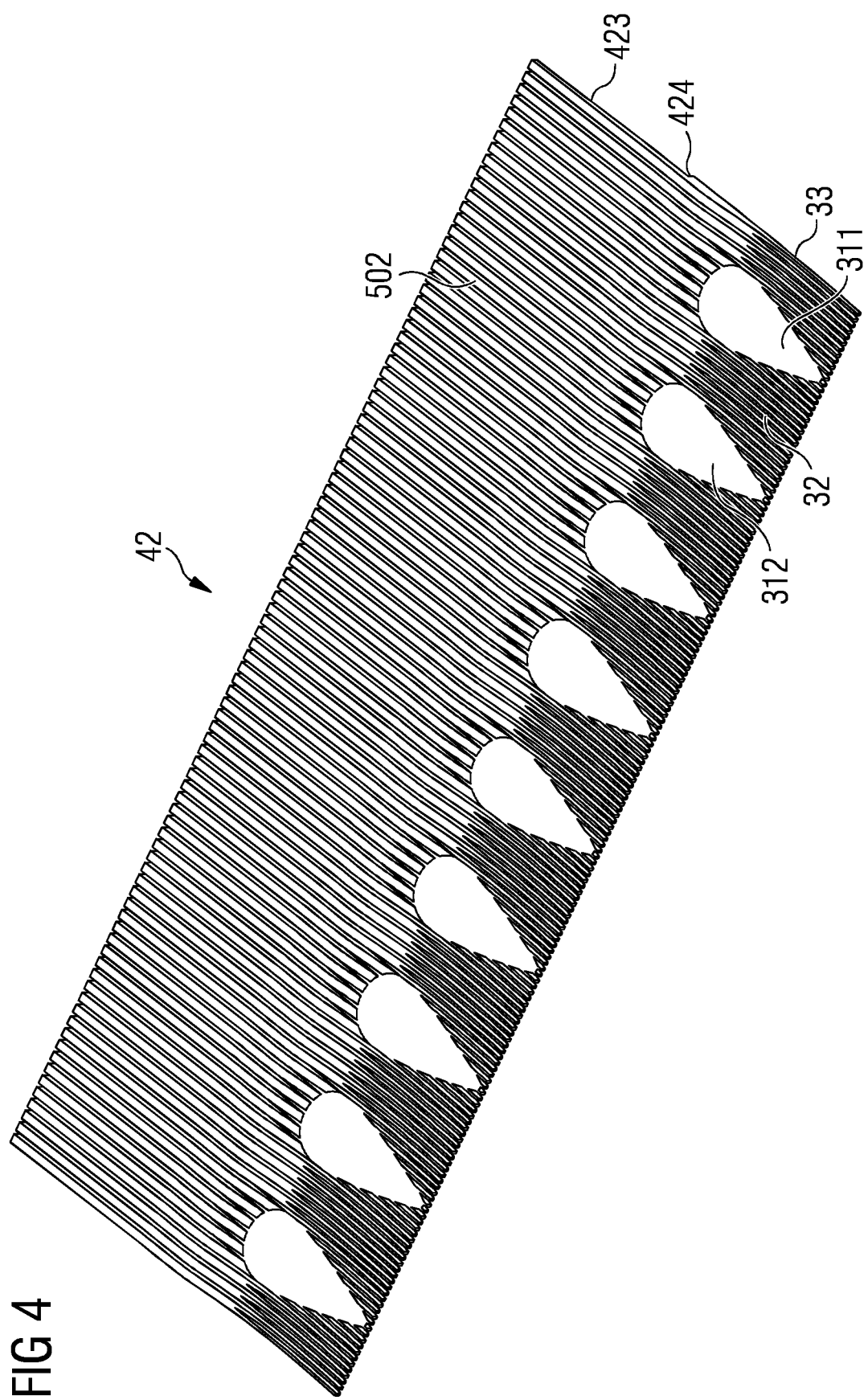
FIG. 4 shows a serrated plate of a rotor blade according to a second embodiment of the invention.

FIG. 4 shows a perspective view of a serrated plate 42 of a rotor blade according to a second embodiment of the invention. FIG. 4 provides a view on the pressure side of the plate 42. Similar to the serrated plate 42 of the first embodiment illustrated in FIG. 3, also the plate 42 according to the second embodiment of the invention comprises a section which is destined for attaching the plate 42 to the pressure side of a rotor blade body. This section is referred to as the attachment section 423. The plate 42 also comprises an alignment section 424, which is characterized by a small step-like flange.

In contrast to the first embodiment of the invention, the serrated plate 42 of the second embodiment comprises a plurality of ridges at its pressure side. Therefore, these ridges are referred to as pressure side ridges 502. The pressure side ridges gradually rise at the upstream end (as seen in the direction of the airflow) of the attachment section 423 and smoothly fade out at the bases of the teeth.

The serrated plate 42 also comprises a plurality of comb elements 33. The comb elements 33 are arranged in the areas 32 between adjacent teeth, such as between the first tooth 311 and the second tooth 312. The ridges 502 and the comb elements 33 are aligned with each other. In particular, they are parallel with each other. Furthermore, every second comb element 33 is aligned and associated with one ridge 502. The ridge-to-comb element ratio is therefore 1:2. It may also be said that every ridge 502 is extended, i.e. prolonged by a comb element 33. Mounting a serrated plate 42 to a trailing edge section of a rotor blade body is a promising way to provide a significant noise reduction at the trailing edge section of the rotor blade.

Figure 5:
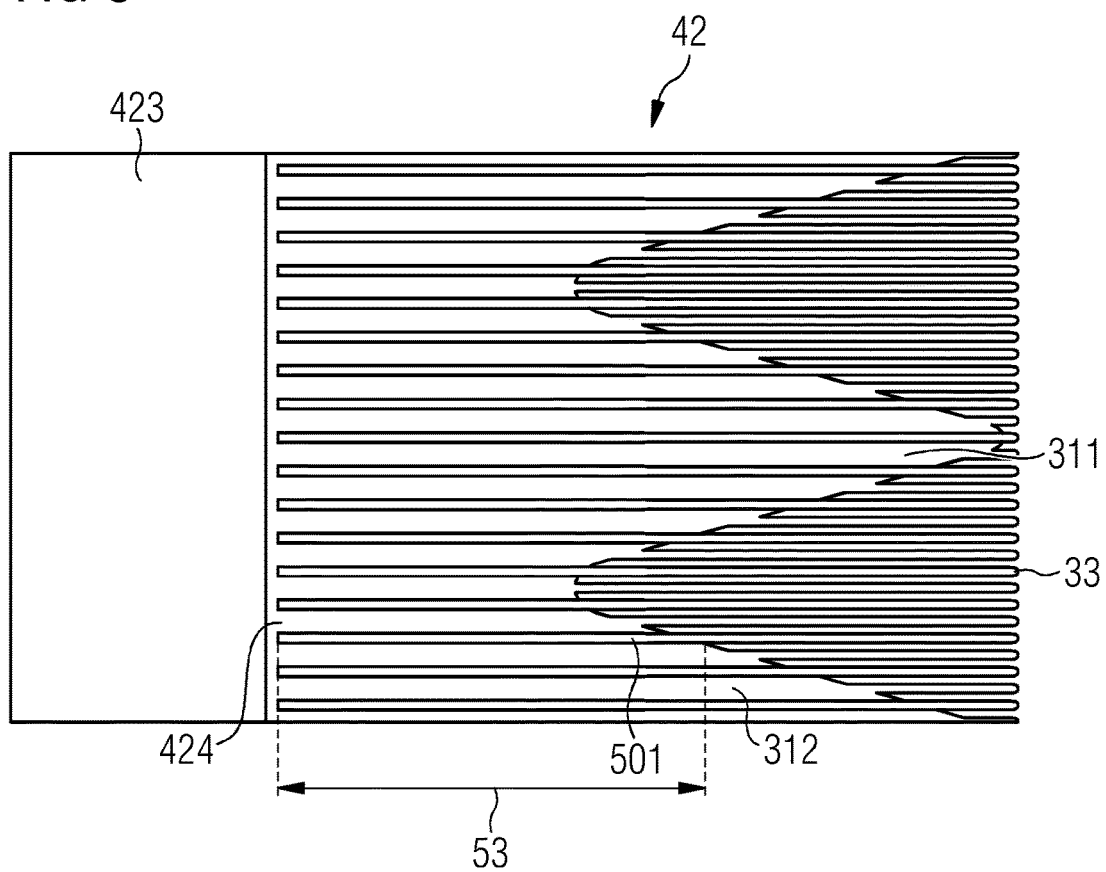
FIG. 5 shows a top view onto the suction side of a part of a serrated plate of a rotor blade according to a third embodiment of the invention.
Figure 6:
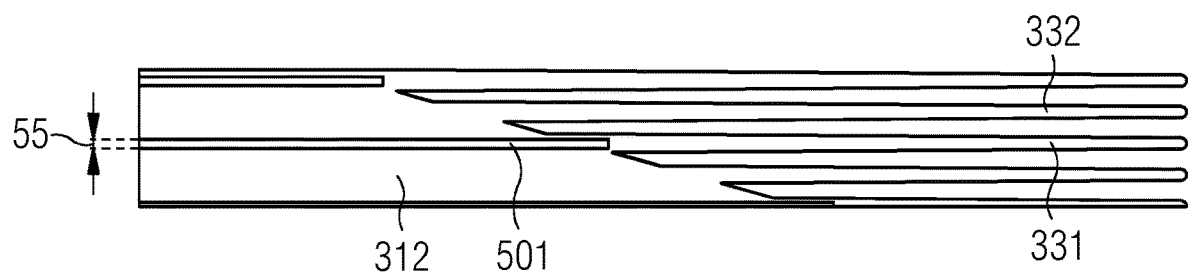
FIG. 6 shows an enlarged view of a part of FIG. 5.
Figure 7:
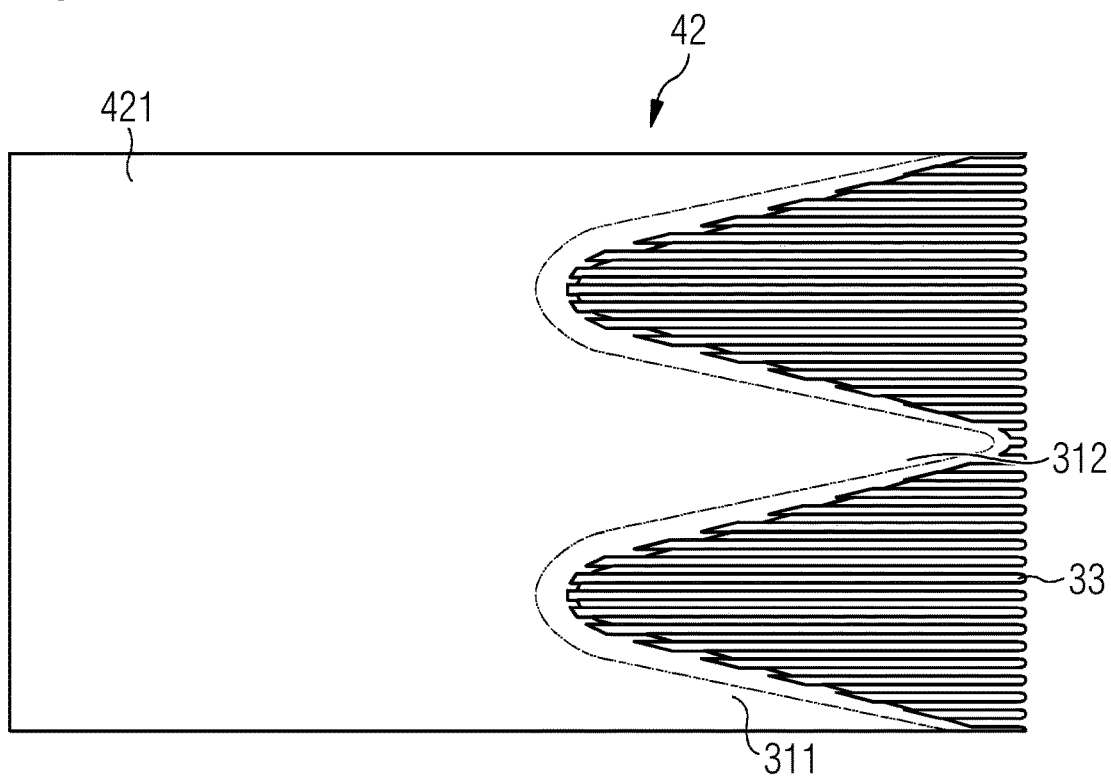
FIG. 7 shows a top view onto the pressure side of a part of the serrated plate of a rotor blade according to the third embodiment of the invention.
Figure 8:
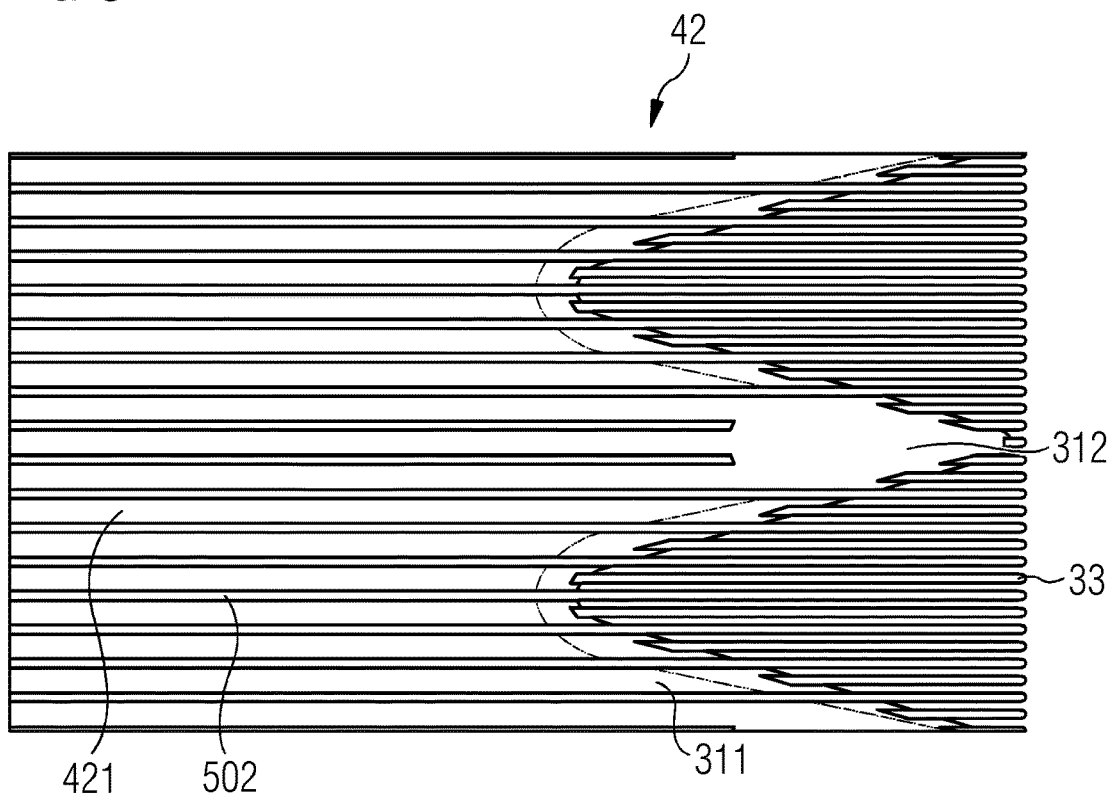
FIG. 8 shows a top view onto the pressure side of a part of the serrated plate of a rotor blade according to a variant of the third embodiment of the invention.

FIGS. 5-8 illustrate a part of a serrated plate 42 of a rotor blade according to a third embodiment of the invention. FIG. 5 shows a top view onto the suction side of a part of the plate, FIG. 6 shows an enlarged view thereof, FIG. 7 shows a top view onto the pressure side of a part of the serrated plate and FIG. 8 shows a variant of the pressure side design of FIG. 7.

The plate 42 comprises a plurality of ridges on its suction side—the ridges are therefore also referred to as suction side ridges 501. The suction side ridges 501 approximately "start" (as seen in the direction of the airflow) at the alignment section 424 of the plate 42 and extend over the entire surface of the respective teeth, e.g. the first tooth 311 or the second tooth 321. Again, the area 32 between the teeth, such as between the first tooth 311 and the second tooth 312, is filled with a plurality of comb elements 33. The suction side ridges 501 are aligned with the comb elements 33 such that every second comb element 33 builds an "extension" of a corresponding ridge 501. In the embodiment of FIGS. 5-8, there exist half as much suction side ridges 501 than comb elements 33.

As can be seen in FIG. 6, which is an enlarged view of a part of FIG. 5, the suction side ridges 501 do not only extend along the complete chordwise extension of the teeth, but even extend slightly further downstream. In other words, the ridges 501 even slightly exceed the flanks, i.e. the sides, of the teeth. Thus, an optimum connection and guidance for the airflow flowing along the ridges and along/across the teeth of the serrations is ensured.

FIG. 6 also illustrates the relatively small width 55 of an exemplary suction side ridge 501 compared to its length 53 (the length 53 of one of the ridges is exemplarily shown in FIG. 5).

FIG. 7 shows the "bottom side", i.e. the pressure side 421 of the serrated plate 42 according to the third embodiment of the invention. Note that, while the suction side of the plate is relatively flat and planar, the pressure side 421 of the plate 42 features a certain convexity (which is insinuated by the dashed line in FIG. 7). The pressure side 421 of the plate 42 in the embodiment as illustrated in FIG. 7 does not comprise any ridges. Therefore, only the teethed structure of the plate (cf. the first tooth 311 and the second tooth 312) and the presence of the plurality of comb elements 33 between the teeth of the serrations is visible.

FIG. 8 shows a variant of the pressure side 421 of the plate 42, thus a variant of the third embodiment of the invention. In this case, the plate 42 comprises a plurality of ridges at its pressure side 421, which is also referenced as pressure side ridges 502. These pressure side ridges 502 partly prolong and directly connect to the respective comb elements 33. However, particularly the ridges 502 being arranged in the center part of the teeth smoothly fade out on the surface of the respective teeth and do not directly connect to the associated comb elements 33. The ridge-comb element ratio is 1:2—thus, the same as at the suction side of the plate 42.

Figure 9:
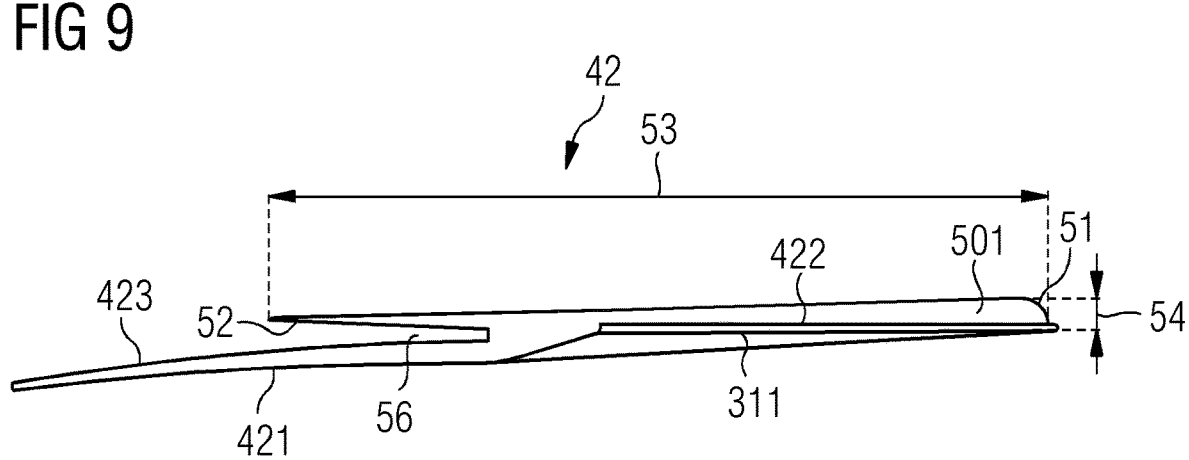
FIG. 9 shows a section view of a serrated plate of a rotor blade with a suction side ridge according to a fourth embodiment of the invention.

Finally, FIG. 9 illustrates a sectional view of serrated plate 42 with a suction side ridge 501 according to a fourth embodiment of the invention.

The fourth embodiment differs from e.g. the first embodiment in that it comprises a suction side ridge 501 which prolongs upstream towards the leading edge of the rotor blade and thus create a certain slot 56 between the suction side 422 of the plate 42 and the attachment section 423 of the plate 42. Additionally, a slot 56 is present between the suction side ridge 501 and the attachment section 423 of the plate 42.

The suction side ridge 501 as shown in FIG. 9 has its maximum height 54 close to its trailing edge 51. The shape of the trailing edge 51 of the suction side ridge 501 resembles a quarter circle. This shape is suggested to efficiently reduce the noise being generated at the trailing edge 51 of the suction side ridge 501.

The leading edge 52 of the suction side ridge 501 has a slowly increasing height, as seen in the direction of the airflow.

A design as in FIG. 9 represents a promising option as it allows for extending the suction side ridges 501 further upstream, while still ensuring a stable attachment of the plate 42 to the remaining part of the rotor blade.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A rotor blade for a wind turbine,
wherein
the rotor blade comprises serrations along at least a portion of a trailing edge section of the rotor blade,
the serrations comprise a first tooth and at least a second tooth, wherein the first tooth is spaced apart from the second tooth,
an area between the first tooth and the second tooth is at least partially filled with a plurality of comb elements, wherein the plurality of comb elements are arranged substantially parallel to each other and in substantially chordwise direction of the rotor blade, such that generation of noise in the trailing edge section of the rotor blade is reduced, and
wherein
the rotor blade further comprises a plurality of ridges comprising a first ridge and at least a second ridge for manipulating an airflow flowing toward the serrations and the plurality of comb elements, the first ridge is positioned in the area between the first tooth and the second tooth and connects to a first comb element of the plurality of comb elements, and the second ridge is positioned on the first tooth and does not connect to any of the plurality of comb elements.

2. The rotor blade according to claim 1,
wherein the ridges are arranged substantially parallel to each other and in substantially chordwise direction of the rotor blade.

3. The rotor blade according to claim 1,
wherein the first ridge comprises a length which is
at least three times greater than a height of the first ridge, and/or
at least three times greater than a width of the first ridge.

4. The rotor blade according to claim 1,
wherein the ridges are aligned with the comb elements.

5. The rotor blade according to claim 1,
wherein each comb element of the plurality of comb elements is associated with one ridge of the plurality of ridges.

6. The rotor blade according to claim 1,
wherein a second comb element of the plurality of comb elements does not connect to any ridge of the plurality of ridges, wherein the second comb element is adjacent to the first comb element.

7. The rotor blade according to claim 1,
wherein the first ridge comprises
a trailing edge, and
a leading edge facing away from the trailing edge section of the rotor blade.

8. The rotor blade according to claim 7,
wherein the trailing edge of the first ridge extends onto the first tooth of the serrations.

9. The rotor blade according to claim 7,
wherein the trailing edge of the first ridge is smoothly fading out towards a trailing edge of the rotor blade.

10. The rotor blade according to claim 7,
wherein the trailing edge of the first ridge has a shape of a quarter circle in a sectional view.

11. The rotor blade according to claim 1,
wherein
the rotor blade comprises a rotor blade body and a serrated plate,
the ridges and the comb elements are mounted on the plate, and
the plate is attached to either a pressure side or a suction side of the rotor blade by an attachment section of the plate.

12. The rotor blade according to claim 10,
wherein the leading edge of the first ridge extends onto the surface of the rotor blade body.

13. The rotor blade according to claim 1,
wherein a maximum height of the first ridge is less than twenty millimeters.

14. A wind turbine for generating electricity with at least one rotor blade according to claim 1.

15. The rotor blade according to claim 7,
wherein the first ridge is a suction side ridge and has a gradually increasing height at the leading edge and an abrupt edge at the trailing edge.

16. The rotor blade according to claim 9, wherein the first ridge is a pressure side ridge and is highest at the leading edge.

17. The rotor blade according to claim 8, wherein the trailing edge of the first ridge extends past the first tooth.

18. The rotor blade according to claim 1, wherein the first ridge has a first trailing edge and the second ridge has a second trailing edge, wherein the second trailing edge extends further than the first trailing edge.

19. A rotor blade for a wind turbine, comprising:
serrations positioned along at least a portion of a trailing edge section of the rotor blade,
wherein the serrations comprise a first tooth and at least a second tooth, and the first tooth is spaced apart from the second tooth,
wherein an area between the first tooth and the second tooth is at least partially filled with a plurality of comb elements, the plurality of comb elements arranged substantially parallel to each other and in substantially chordwise direction of the rotor blade, such that generation of noise in the trailing edge section of the rotor blade is reduced,
wherein the rotor blade further comprises a plurality of ridges comprising a first ridge and at least a second ridge for manipulating an airflow flowing toward the serrations and the plurality of comb elements,
wherein the first ridge comprises a trailing edge and a leading edge facing away from the trailing edge section of the rotor blade, and the trailing edge of the first ridge extends onto the first tooth of the serrations and past the first tooth.

20. A rotor blade for a wind turbine, comprising:
serrations positioned along at least a portion of a trailing edge section of the rotor blade, wherein the serrations comprise a first tooth and at least a second tooth, the first tooth is spaced apart from the second tooth,
a plurality of comb elements positioned in an area between the first tooth and the second tooth, wherein the plurality of comb elements are arranged substantially parallel to each other and in substantially chordwise direction of the rotor blade, such that generation of noise in the trailing edge section of the rotor blade is reduced, and
a plurality of ridges comprising a first ridge and at least a second ridge for manipulating an airflow flowing toward the serrations and the plurality of comb elements, wherein the first ridge is positioned in the area between the first tooth and the second tooth and connects to a comb element of the plurality of comb elements, and the second ridge is positioned on the first tooth and does not connect to any of the plurality of comb elements.

* * * * *